United States Patent [19]

Morse

[11] Patent Number: 4,487,537
[45] Date of Patent: Dec. 11, 1984

[54] DRUM TIE-DOWN APPARATUS

[75] Inventor: Harvey E. Morse, Albuquerque, N. Mex.

[73] Assignee: The United States of America as represented by the United States Department of Energy, Washington, D.C.

[21] Appl. No.: 462,817

[22] Filed: Feb. 1, 1983

[51] Int. Cl.³ .............................................. B60P 7/12
[52] U.S. Cl. .................................. 410/47; 24/115 H; 24/68 CT; 248/499; 248/DIG. 7; 410/99; 410/100
[58] Field of Search .......... 24/68 CT, 69 WT, 115 G, 24/115 H, 115 J; 248/154, 499, 505, DIG. 7; 410/41, 47, 96, 97, 99, -104, 155, 156

[56] References Cited

U.S. PATENT DOCUMENTS

| | | | |
|---|---|---|---|
| 2,298,851 | 10/1942 | Wachter | 410/44 |
| 2,715,008 | 8/1955 | Huber | 410/99 X |
| 3,154,026 | 10/1964 | Klasing, Jr. | 410/41 |
| 3,229,952 | 1/1966 | Zumbo | 24/68 CT X |
| 3,290,010 | 12/1966 | Holmes | 410/97 X |
| 3,580,187 | 5/1971 | Marks | 410/100 |
| 3,988,005 | 10/1976 | Mooney et al. | 410/97 X |
| 4,020,630 | 5/1977 | De Shetler | 59/86 |

FOREIGN PATENT DOCUMENTS

| | | | |
|---|---|---|---|
| 745821 | 11/1966 | Canada | 410/99 |
| 557943 | 5/1977 | U.S.S.R. | 410/99 |

*Primary Examiner*—Robert B. Reeves
*Assistant Examiner*—David F. Hubbuch
*Attorney, Agent, or Firm*—James H. Chafin; Albert Sopp

[57] ABSTRACT

A drum tie-down apparatus for securing drum-like containers in an upright position to a floor or platform of a transportation vehicle having spaced apart cargo tie-down points. The apparatus comprises a pair of cylindrical, hollow tube segments horizontally oriented and engageable with a drum lid adjacent opposite rim edges, flexible strap segments for connecting upper and lower central portions of the tube segments together across the drum lid and a pair of elongated flexible tie-down segments, one extending horizontally through each of the tube segments, the ends thereof being attached to said spaced apart tie-down points such that end portions of the pair of tie-down segments extend downwardly and radially outwardly from the tube segments to the tie-down points.

10 Claims, 6 Drawing Figures

DRUM TIE-DOWN APPARATUS

BACKGROUND OF THE INVENTION

1. Field of the Invention

The present invention relates to apparatus for securing cargo and, more particularly, but not by way of limitation, to a tie-down apparatus for securing drum-like containers in place against movement on a cargo vehicle, floor or platform.

2. History of the Prior Art

Steel drums, kegs and the like are and have been used extensively in industry for containing, storing, shipping and dispensing products. The drum is relatively easy to manufacture and exhibits high strength characteristics due to its shape. Drums come in a variety of sizes varying in both height and diameter, for the purpose of containing articles of manufacture, bulk goods, liquid and gas.

However, since the first drum was shipped on a cargo vehicle, there have been problems securing the drum in place against movement relative to the vehicle. The same shape that makes the drum strong and easy to manufacture also makes it difficult to tie down.

Naturally, the drums could be fitted into rectangular containers for ease in shipment, as are canned goods; but this would require the effort and expense of building secondary containers.

A drum is a difficult container to secure under high horizontal longitudinal or lateral loads because it has few features for grasping the drum without subjecting the side wall, the weakest surface of the drum, to loading which is apt to damage the drum.

One attempted solution to the problem of tying down drums and general cargo is presented in the patent to Klasing, Jr., U.S. Pat. No. 3,154,026, issued Oct. 27, 1964 for an "Articulated Tie-down Load Control Bracket".

The Klasing, Jr., device consists of inverted L-shaped brackets which fit over the upper rim of the drum with downwardly extending leg members which rest on the drum wall. The upper portion of the L-shaped brackets are attached together by chain links across the top of the drum and the lower leg members of the brackets are secured to tie-down points in a manner to prevent vertical or sidewise movement of the drums.

However, if the drum secured by the Klasing, Jr., device experiences rapid acceleration in a horizontal longitudinal direction, in line with the brackets, the downwardly extending leg members along with the tie-down chains would tend to dig into the drum sidewall, which, as stated, is the weakest part of the drum.

Other methods of securing drums in place in cargo vehicles include the use of webbing or straps which extend around the drum body and are typically attached to tie-down points on the walls of the cargo vehicle or the like. This method usually takes up a considerable amount of cargo space and requires the abilities of a skilled load master in order to assure that each drum is properly secured.

SUMMARY OF THE INVENTION

The present invention provides a drum tie-down apparatus which is particularly designed and constructed to firmly secure a drum-like container in place on a cargo floor or platform in a manner such that the loading applied to the drum by the tie-down apparatus provides essentially downwardly directed loads applied at the lid near the reinforced rim portion of the drum so that these downwardly directed loads are taken out by the vertical sidewalls of the drum.

The present invention provides a drum tie-down apparatus which comprises a pair of cylindrical hollow tube segments which are rectangular in cross sectional shape and which are horizontally positioned on the drum lid adjacent opposite rim edges. Each tube segment is provided with a chain or strap attachment means on the upper and lower surfaces thereof whereby a pair of straps or chains are utilized for connecting the upper and lower portions of the tube segments together across the drum lid.

A pair of elongated flexible tie-down segments, which may be of rope, wire rope, strap material or chains are provided, one extending horizontally through each of the tube segments and having attachment apparatus at the ends thereof for attaching these tie-down segments to spaced tie-down points which are normally located on the floor or platform on which the drums are being carried. The tie-down segments, after being passed through the tube members extend radially outwardly and downwardly to the said tie-down points in order to prevent the drum from moving either sideways or longitudinally in a horizontal direction. Additional securing can be provided at the base of the drum in the form of chock blocks or separate tie-down traps, which are placed around the periphery at the base of the drum as opposed to the middle sidewalls, which are more vulnerable to bending and damage.

Also, the typical manner of securing the drum is to first determine the direction in which extreme loads may occur, such as the forward direction of the vehicle and aligning the tube segment members in the direction in which the expected high loads are to occur.

In this manner, if high acceleration does occur, such as would occur in rapid breaking of the vehicle or a collision, the lower part of the drum would be secured in place by the chock or auxiliary strap while the upper portion of the drum is held in place by the tie-down apparatus. The device is also very effective in securing the drum against movement due to side loading.

DESCRIPTION OF THE DRAWINGS

Other and further advantageous features of the present invention will hereinafter more fully appear in connection with a detailed description of the drawings in which.

DESCRIPTION OF THE PREFERRED EMBODIMENTS

Figure 1:
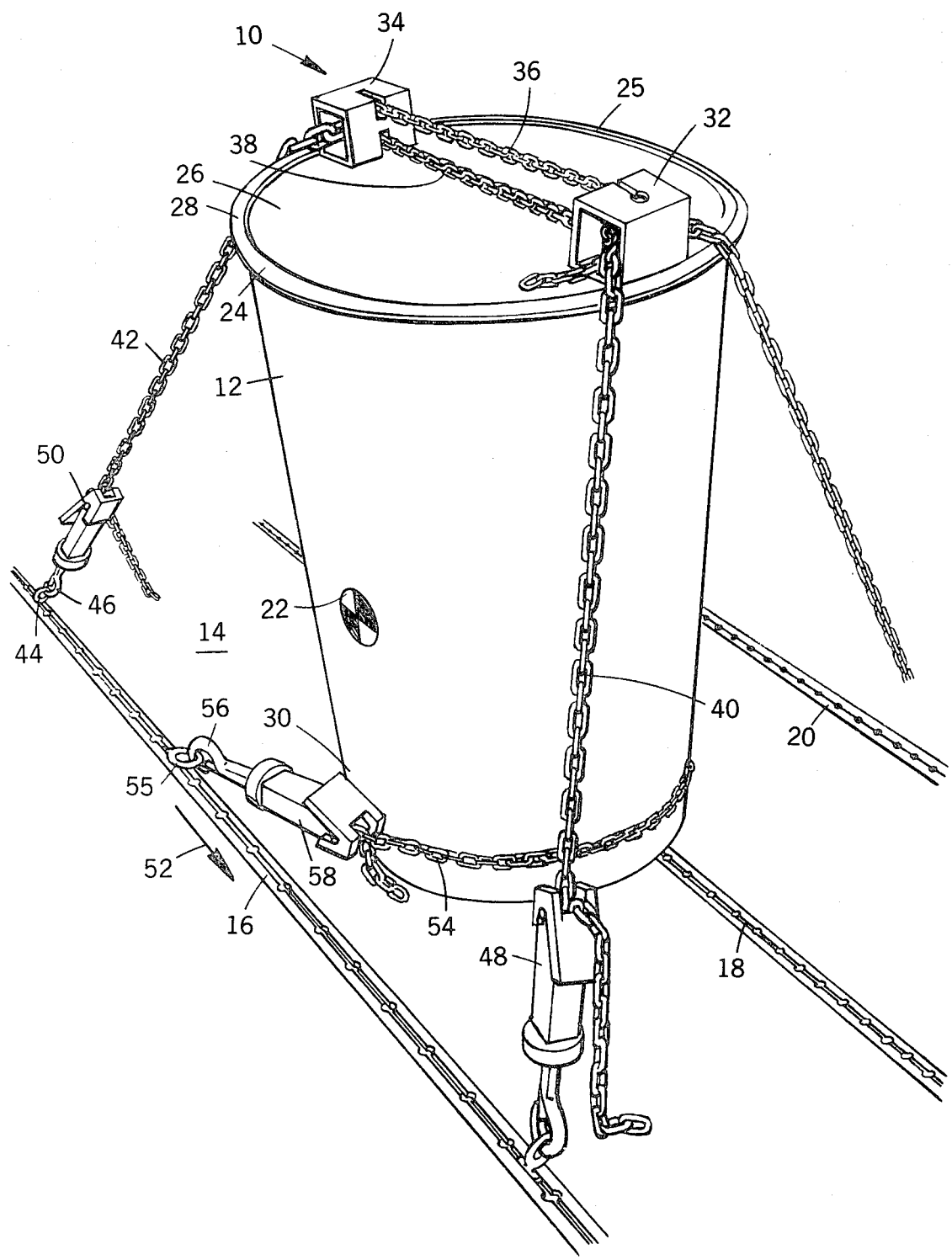
FIG. 1 is a perspective view of a drum being secured with a tie-down apparatus embodying the present invention.

Referring to the drawings in detail, particularly FIG. 1, reference character 10 generally indicates a tie-down apparatus for securing a drum 12 in securing position on a cargo floor or platform indicated by reference character 14.

The cargo floor 14 is equipped with a plurality of spaced parallel tie-down tracks 16, 18 and 20, which are typically aligned in the direction of travel of the vehicle or in which the highest loading might be experienced due to braking, acceleration or collision.

The drum 12 typically comprises a cylindrical body 22 terminating in a rim assembly 25 consisting of an outwardly extending lip member 24 around the upper edge thereof, a circular lid member 26 and a reinforced retaining ring 28 there around. The base 30 of the drum may or may not contain a structure similar to the top but typically is provided with a reinforced rim.

The tie-down apparatus 10 comprises a pair of cylindrical hollow tube segments 32 and 34 having rectangular cross sections and which are horizontally positioned on the upper surface of the lid mmeber 26 adjacent the rim assembly 25.

A pair of chain segments 36 and 38 attach the upper and lower portions of the tube segments 32 and 34 together across the drum lid 26.

A pair of elongated tie-down chains 40 and 42 are passed transversely through the hollow tube sections 32 and 34, respectively, and are in turn attached to spaced tie-down points on the tie-down tracks 16 and 20 by means of eyelets 44 and hooks 46. The tie-down chains 40 and 42 are provided with tensioning devices 48 and 50, respectively, for the purpose of maintaining the tie-down chains taut.

If the forward direction of travel is in alignment with the arrow 52, the base 30 of the drum may be secured in place by a chain 54 passing around the front lower edge of the drum as shown, and also secured by means of eyelets and hooks 55 and 56 and may also be provided with a tensioning device indicated by reference character 58.

It is further noted that the tie-down chain members 40 and 42 pass through the apertures in the tube segments 32 and 34 and over the rim 25 of the drum so that when the tie-down chains are put into tension, the force applied to the drum is, for all practical purposes, applied directly to the reinforced rim assembly 25 and is directed essentially downwardly so that the vertical sidewalls of the drum are loaded.

Figure 3:
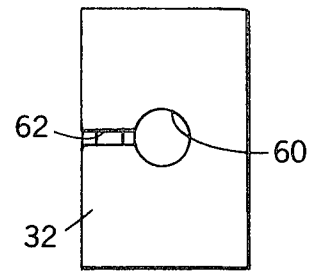
FIG. 3 is a top plan view of one of the tube segments of FIGS. 1 and 2.
Figure 2:
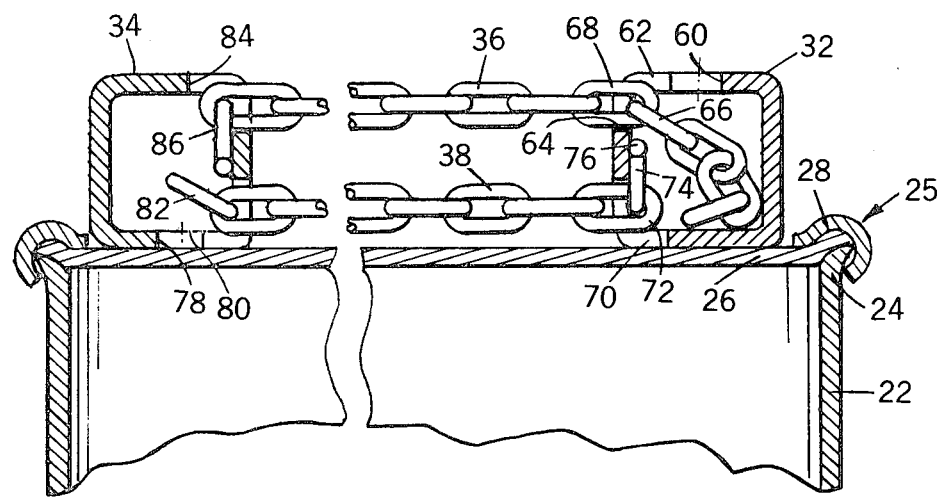
FIG. 2 is a partial side elevational view shown partially in section of the drum and tie-down apparatus of FIG. 1.

Referring now to FIGS. 2 and 3 of the drawing, the tube segment 32 is provided with a vertically disposed eye bore 60 in the upper central portion thereof with a connecting slot 62 which extends inwardly toward the center of the drum and terminates at 64 on the inwardly facing surface of the segment 32.

The end portion 66 of the chain 36 may be inserted through the eye aperture 60 into the interior of the tube segment 32 with one link 68 being fed into the aperture 62 in order to secure the chain 36 to the upper portion of the tube segment 32 as shown in FIG. 2. The lower and front portion of the tube segment 32 is provided with an L-shaped slot aperture 70 for receiving a portion of a link 72 of the chain 38 therein. Another broken link 74 is then connected to the chain link 72 and is closed with a welded cross member 76 for permanently securing the end of the chain 38 to the lower front portion of the tube segment 32.

The tube segment 34 is similarly constructed with a vertical eye bore 78 through a central bottom portion thereof which is in turn connected with an inwardly extending slot aperture 80, which is L-shaped and extends around to the inside surface of the tube segment 34 for likewise receiving an end portion 82 of the chain 38. The tube segment 34 is also provided with an L-shaped slot 84 similar to the slot 70 of the tube segment 32 for receiving an end portion 86 of the chain member 36 so that it is fixed permanently as described in connection with the attachment of the chain 38 to the tube segment 32.

In fact, it can be seen that tube segments 32 and 34 may be identically constructed with the tube segment 34 mounted upside down with respect to the tube segment 32. The end portions 66 and 82 of the chains 36 and 38, respectively, can be of considerable length to accommodate substantially any drum diameter. It is further noted that the permanent connections of the end of the chain 38 to the tube section 32 and the end of the chain 36 to the tube segment 34 may be made by welding or any other acceptable means. In fact, the members 36 and 38 may be of any suitable material such as cable and the like so long as an adjustable attachment is accomplished to connect the upper portion of the tube segment 32 to the upper portion of the tube segment 34 and to likewise attach the bottom portions thereof, as shown.

In this same vein, it is noted that the tie-down segments 40 and 42 which are depicted as chains may be of any suitable materials such as nylon strap, rope, wire cable and the like, which are provided with the ability to adjust the length thereof and the tension.

Figure 4:
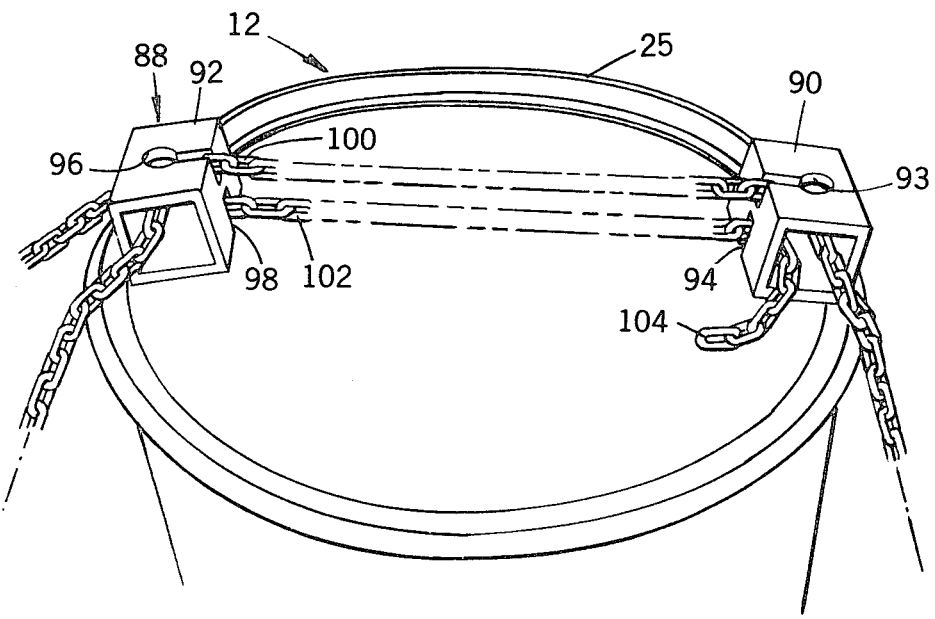
FIG. 4 is a perspective view of a drum having a tie-down apparatus representing a second embodiment of the invention.

Referring to FIG. 4 of the drawings, a similar drum 12 having a similar rim assembly 25 may be secured by a tie-down apparatus generally indicated by reference character 88. The tie-down apparatus 88 is similar in operation to the apparatus 10 with the following differences. Tie-down apparatus 88 comprises a pair of similar tube sections 90 and 92. The tube segment 92 comprises an eye-slot aperture 93 in the upper and inside surface thereof similar to the eye and slot, 60 and 62, of the tube segment 32. A similar eye-slot aperture 94 is provided in the bottom and inside surface of the tube segment 90. Likewise, the tube segment 92 is provided with upper and lower eye-slot apertures 96 and 98. The connecting chain segments are shown as segments 100 and 102 and may constitute two separate chain members attached as shown or may constitute a single chain member having one end attached in the eye-slot aperture 93 passing across through the eye-slot aperture 96 of the tube segment 92, interior of the tube segment 92 and back out of the eye-slot aperture 98 and back into the eye-slot aperture 94 terminating in an end portion 104. It is important that the upper surfaces of the tube segments 90 and 92 and the lower surfaces thereof be attached by the members 100 and 102 to prevent rotation of the tube segment under extreme loading conditions.

Figure 5:
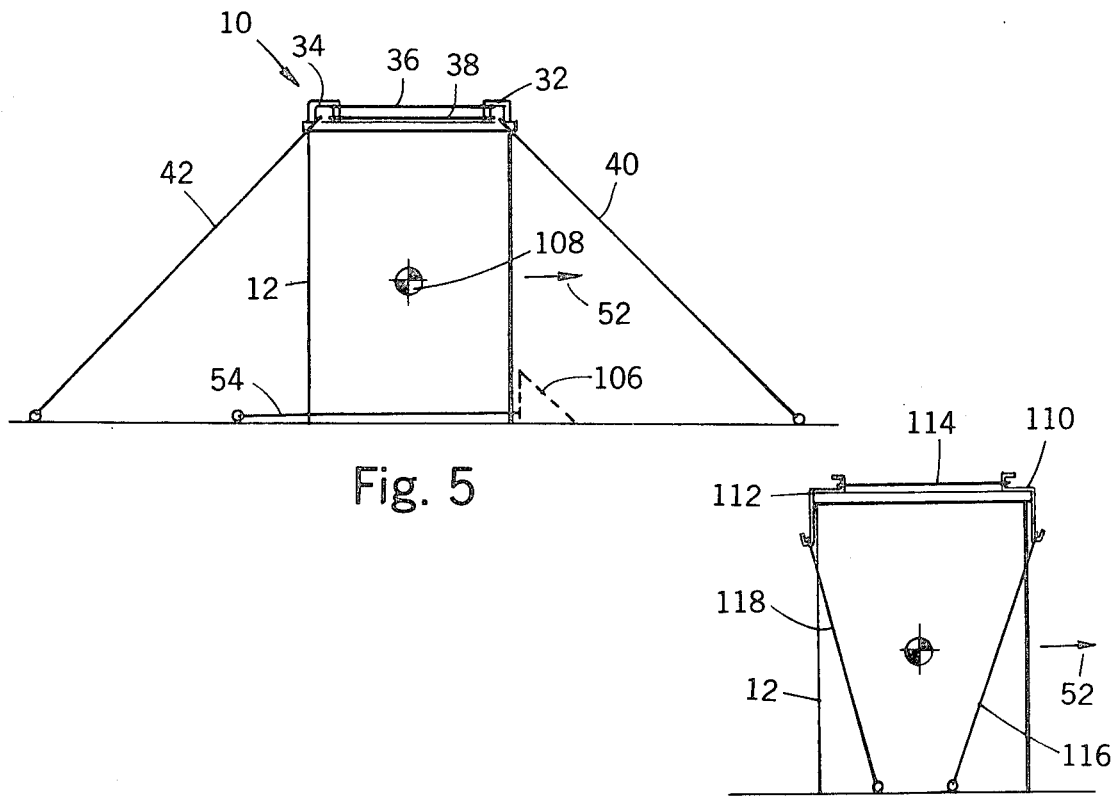
FIG. 5 is a side elevational diagrammatical view of a drum and tie-down apparatus embodying the present invention; and, FIG. 6 is a side elevational diagrammatical view of a tie-down apparatus representing the prior art.

Referring now to FIG. 5 of the drawings, the figure depicted is a diagrammatical side elevational view of the tie-down attachment arrangement depicted in FIG. 1. The reference character numbers have been copied from those of FIG. 1 for simplicity along with the direction of travel indicated by arrow 52.

A chock member 106 is depicted as an alternate method of securing the lower end of the drum against movement as opposed to the strap or chain member 54. The center of gravity of the drum is generally indicated at reference character 108 in the central portion of the drum but may occur elsewhere, according to the configuration of the product carried in the drum.

If the vehicle were to apply brakes rapidly or be involved in a forward moving collision, the drum would tend to translate forward in the direction indicated by arrow 52. The lower end of the drum would be stopped from any forward movement by either the chock 106 or the restraining strap 54, thereby causing the drum to tend to try to pivot around the point adjacent the chock 106. However, forward tipping of the drum would be restrained by the tie-down cable or chain 42 again with the loading on the drum being primarily downwardly along the vertical sidewalls thereof. If the tube segments try to slip horizontally on the drum lid surface the rim assembly 25 will prevent either of the tube segments from slipping off the side.

Figure 6:
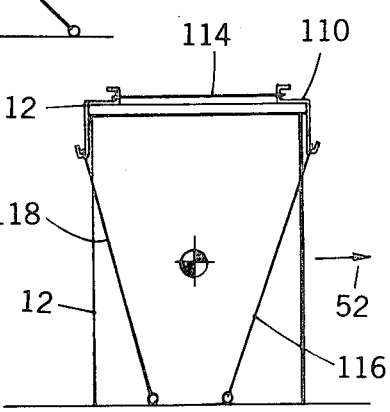

FIG. 6 of the drawings diagrammatically represents an attachment arrangement similar to that of the prior art patent by Klasing, Jr., supra, wherein L-shaped bracket members 110 and 112 are attached to opposite sides of the upper rim of the drum 12. The upper portions of the brackets 112 are in turn connected by one or more cables 114. Tie-down cables 116 and 118 in turn secure the downwardly extending leg members of the brackets 110 and 112 to suitable tie-down points. In the absence of a chock or other apparatus for restraining the lower part of the drum, upon the vehicle experiencing collision or deceleration, the drum would again tend to translate forwardly in the direction indicated by arrow 52.

In this case, it can be seen that the restraining load would be taken up by the cable 116 which would cause the lower end of the leg members of the bracket 110 to tend to dig into the sidewalls of the drum, which would damage the drum or cause the drum to collapse.

If the device in FIG. 6 were provided with a chock member similar to that of 106 and shown in FIG. 5 of the drawings, the drum would try to tip around the chock member and, in turn, tipping would be opposed or restrained by both cable member 116 and 118, thereby causing both lower leg members of the L-shaped brackets 110 and 112 to tend to dig into the walls of the container.

From the foregoing, it is apparent that the present invention provides a drum tie-down device for restraining movement of a drum in substantially any direction, whether the movement be translatory or through a rotation type movement. The apparatus taught by the present invention is simple and efficient in construction, as well as being economical. The devices are small, relatively light, easily stowed and are adjustable in size to accommodate substantially any drum diameter or height.

Since the tube segments 32 and 34 of the present invention may be oriented in accordance with the chain links 36 and 38, the invention may be utilized on any drum lid whether it has concave or convex shape. It is noted when chains are used, as depicted in FIG. 1 of the drawings, for the links 36 and 38, a small amount of length adjustment may be made by twisting one or both of the chains.

Whereas the present invention has been described in particular relation to the drawings attached hereto, other and further modifications apart from those shown or suggested herein may be made within the spirit and scope of the invention.

I claim:

1. A drum tie-down apparatus for securing drum-like containers in an upright position to a floor or platform of a transportation vehicle having spaced-apart cargo tie-down points, comprising:
   first and second spaced apart hollow tube segments, whose longitudinal axes are horizontally oriented, engageable with a drum lid adjacent to opposite rim edges;
   flexible strap segment means for connecting upper and lower central portions of said tube segments together across the drum lid; and
   a pair of elongated flexible tie-down segments, each extending horizontally through a respective tube segment and having means for attaching the ends thereof to said spaced apart tie-down points such that end portions of the pair of tie-down segments extend downwardly and radially outwardly from the tube segments to the tie-down points.

2. A drum tie-down apparatus as set forth in claim 1 wherein the flexible strap segment means is adjustable in length to accommodate containers of different diameters.

3. A drum tie-down apparatus as set forth in claim 2 wherein the flexible strap segment means comprises at least one chain member and each tube segment is provided with aperture means to enable the upper portions of the tube segments to be adjustably connected together and the lower portions of the tube segments to be adjustably connected together.

4. A drum tie-down apparatus as set forth in claim 3 wherein said flexible strap segment means comprises first and second chain members, said aperture means comprising an eye-slot aperture in the upper portion of the first tube segment and a like eye-slot aperture in the lower portion of the second tube segment, the first chain member having one end rigidly secured to an upper portion of the second tube segment, with the opposite end being adjustably connectible to the eye-slot aperture of the first tube segment and the second chain member having one end rigidly secure to a lower portion of the first tube segment, with the opposite end being adjustably connectible to the eye-slot aperture of the second tube segment.

5. A drum tie-down apparatus as set forth in claim 4 wherein the tube segments are of rectangular cross section and wherein a slot portion of the eye-slot aperture of each tube segment extends into an inner surface of its respective tube segment which faces a center portion of the drum lid when in securing position in order to permit direct contact of the lower surfaces of both tube segments to the drum lid surface.

6. A drum tie-down apparatus as set forth in claim 1 wherein the tube segments are rectangular in cross sectional shape and each tube segment being provided with an eye-slot aperture in both upper and lower surfaces thereof, each eye-slot aperture having a slot which extends toward the center portion of the drum lid when in securing position and whereby said flexible strap segment means comprises at least one chain segment connectible between the upper eye-slot apertures of the tube segments and between the lower eye-slot apertures of the tube segments.

7. A drum tie-down apparatus as set forth in claim 1 wherein the tube segments are rectangular in cross sectional shape and wherein each tube segment is provided with upper and lower eye-slot apertures therein, each eye-slot aperture having a slot which extends toward the center portion of the drum lid when in securing position and wherein the flexible strap segment means comprises a chain segment connectible from the upper eye-slot of the first tube segment, to the upper eye-slot of the second tube segment and out of the lower eye-slot thereof back to the lower eye-slot of the first tube segment.

8. A drum tie-down apparatus as set forth in claim 1 wherein the flexible tie-down segments are adjustable in length.

9. A drum tie-down apparatus as set forth in claim 1 wherein the flexible tie-down segments are each provided with means for tensioning its respective tie-down segment when in securing position.

10. A drum tie-down apparatus as set forth in claim 1 wherein the tie-down segments are chain members.

* * * * *